(12) United States Patent
Hatazawa

(10) Patent No.: US 7,194,749 B2
(45) Date of Patent: Mar. 20, 2007

(54) OBJECTIVE LENS ACTUATOR AND OPTICAL PICKUP DEVICE

(75) Inventor: Kenji Hatazawa, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 524 days.

(21) Appl. No.: 10/740,996

(22) Filed: Dec. 19, 2003

(65) Prior Publication Data

US 2004/0130978 A1 Jul. 8, 2004

(30) Foreign Application Priority Data

Dec. 20, 2002 (JP) ............................. 2002-370996
Oct. 14, 2003 (JP) ............................. 2003-353350

(51) Int. Cl.
*G11B 7/085* (2006.01)

(52) U.S. Cl. .................................... 720/683

(58) Field of Classification Search ............... 720/681, 720/683, 684; 369/44.12, 44.32
See application file for complete search history.

(56) References Cited

U.S. PATENT DOCUMENTS

| | | | | |
|---|---|---|---|---|
| 5,216,648 | A * | 6/1993 | Noda et al. | 369/44.16 |
| 6,744,722 | B2 * | 6/2004 | Choi | 720/683 |
| 6,922,842 | B2 * | 7/2005 | Takahashi et al. | 720/684 |
| 6,996,039 | B2 * | 2/2006 | Choi | 369/44.32 |
| 7,076,791 | B2 * | 7/2006 | Mori et al. | 720/683 |

FOREIGN PATENT DOCUMENTS

| | | |
|---|---|---|
| JP | 11-312327 | 11/1999 |
| JP | 2000-222755 | 8/2000 |
| JP | 2002-216380 | 8/2002 |

* cited by examiner

*Primary Examiner*—Tianjie Chen
(74) *Attorney, Agent, or Firm*—Morrison & Foerster LLP

(57) ABSTRACT

An objective lens actuator includes an objective-lens-side main magnet and two stationary-holder-side main magnets mounted to a base body. The objective-lens-side main magnet is positioned to face the two stationary-holder-side main magnets across a gap. The magnets form a magnetic circuit producing magnetic flux extending from either the objective-lens-side main magnet or the two stationary-holder-side main magnets to the remaining magnet(s). The objective lens holder includes a focusing coil and a tilting coil. The focusing coil is located so that the objective-lens-side main magnet and the two stationary-holder-side main magnets are present outside and inside a winding of the focusing coil respectively. The tilting coil is located so that: the objective-lens-side main magnet is present outside a winding of the tilting coil; one of the stationary-holder-side main magnets is present inside the winding; and the remaining one of the stationary-holder-side main magnets is present outside the winding. The structure enables tilt correction and restrains undesirable tilting of the objective lens in a focusing action, for example.

16 Claims, 10 Drawing Sheets

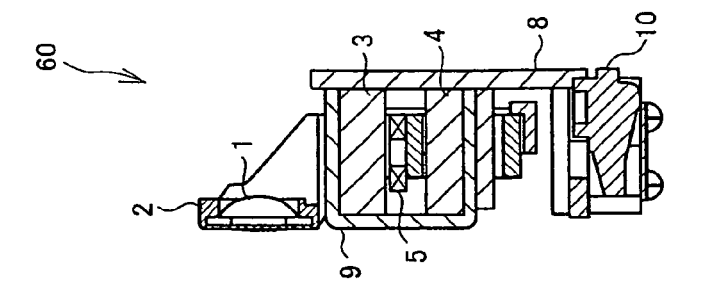
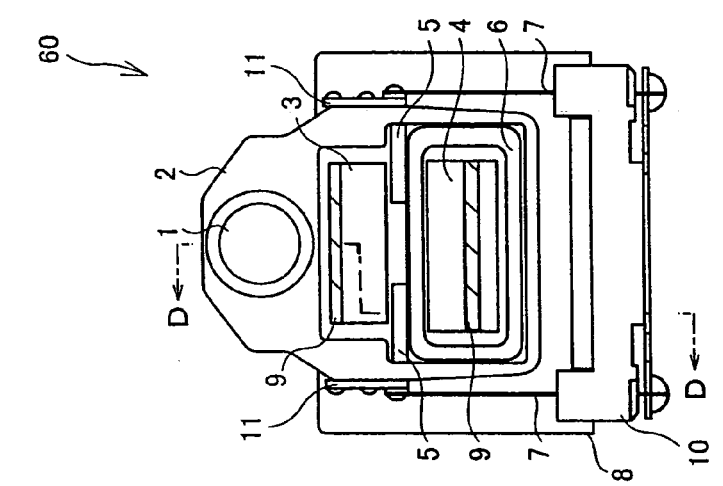
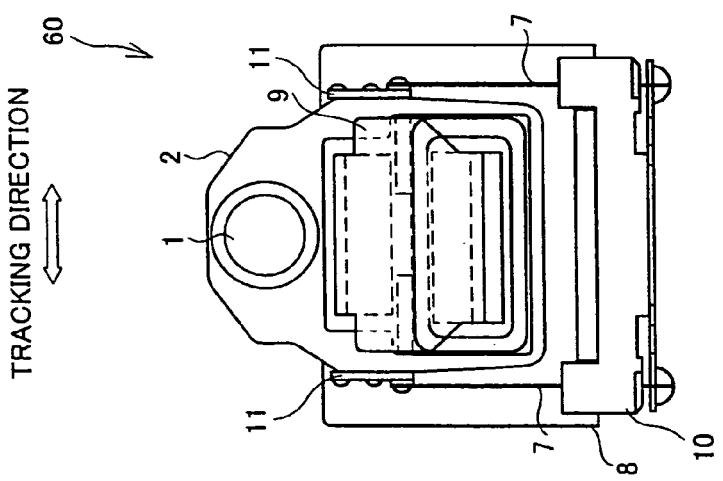
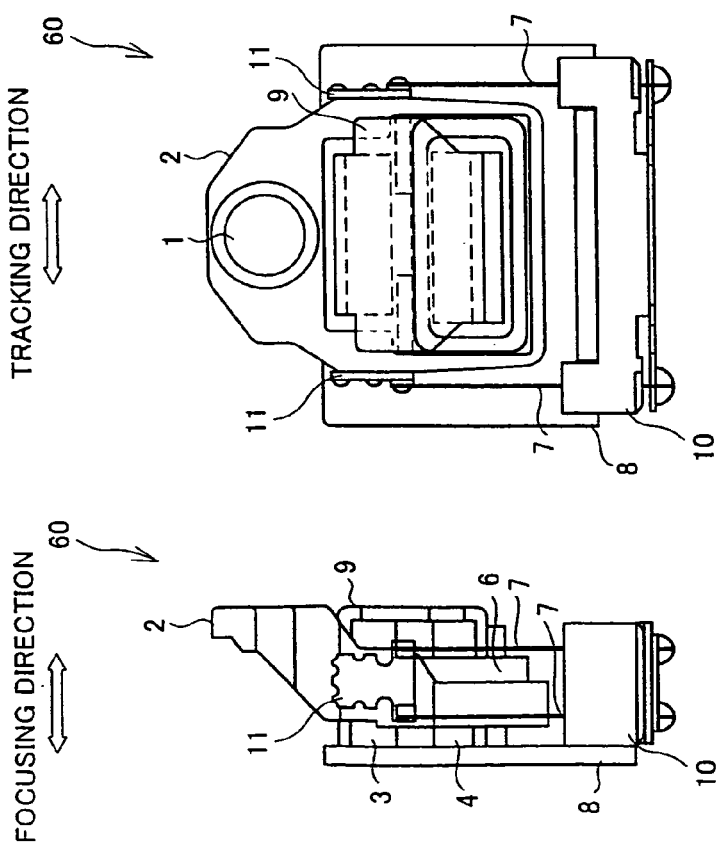

OBJECTIVE LENS ACTUATOR AND OPTICAL PICKUP DEVICE

This Nonprovisional application claims priority under 35 U.S.C. § 119(a) on Patent Applications No. 2002-370996 filed in Japan on Dec. 20, 2002 and No. 2003-353350 filed in Japan on Oct. 14, 2003, the entire contents of which are hereby incorporated by reference.

FIELD OF THE INVENTION

The present invention relates generally to an objective lens actuator in a read/write optical pickup device for an optical information disc and an optical pickup device equipped with the objective lens actuator, and especially to an objective lens actuator and optical pickup device for use in high density data reading/writing for an optical information disc. The objective lens actuator and optical pickup device are capable of compensation for warp of an optical information disc when, for example, the objective lens has a numerical aperture of 0.6 or greater and the laser beam has a wavelength of 660 nm or less.

BACKGROUND OF THE INVENTION

Optical pickup devices for reading/writing an optical information disc have an objective lens actuator. Provided with an objective lens, the objective lens actuator moves the objective lens relatively to the optical information disc in a focusing direction and a tracking direction.

Recent optical information discs provide increasingly high date storage densities. Objective lenses for use in a read/write process for an optical information disc have increasingly large numerical apertures (NA).

When the optic axis of the objective lens inclines off. the normal to the recording surface of the optical information disc, the spot formed by light converged by the objective lens exhibits coma and astigmatism aberrations. Coma aberration increases in proportion to the cube of the numerical aperture of the objective lens. Astigmatism aberration increases in proportion to the square of the numerical aperture of the objective lens. Therefore, objective lenses with a larger numerical aperture allow a smaller tilt for the optic axis of the objective lens.

The optical information disc of high storage density is warped like a bowl in a write/read process. Accordingly, there is an increasing need to change the orientation of the objective lens so that the tilt be corrected, i.e., the optic axis of the objective lens be always normal to the disc's recording surface.

An objective lens actuator enabling such tilt correction is disclosed in, for example, Japanese published unexamined patent application 2002-216380 (Tokukai 2002-216380; published on Aug. 2, 2002). An objective lens actuator disclosed in Tokukai 2002-216380 employs a moving magnet drive method where a magnetic yoke, focusing coil, and tracking coil are fixed to a base, and a lens holder and drive magnet move together.

However, in the objective lens actuator implementing the moving magnet drive method, the heavy magnet is inevitably mounted to a movable assembly, adding to its weight and adversely affecting its response in focusing, tracking, and tilt correction. The excess weight of the movable assembly is an especially serious issue when, for example, a large magnet is used to improve the magnetic circuit.

Another issue with the objective lens actuator is undesired tilting of the movable assembly. The phenomenon can be caused by the attraction between the magnet mounted to the movable assembly and the magnetic yoke mounted to the fixed assembly, depending on the shape of the magnetic yoke.

An objective lens actuator employing a moving coil drive method is disclosed in, for example, Japanese published unexamined patent application 11-312327 (Tokukaihei 11-312327/1999; published on Nov. 9, 1999). FIG. 9 shows the structure of an objective lens actuator 100 disclosed in Tokukaihei 11-312327/1999. The objective lens actuator 100 has two focusing coils 115a, 115b. Assume in FIG. 9 that the focusing direction matches the direction of the optic axis of an objective lens 113, or z-axis, and the tracking direction matches the disc's radial direction, or y-axis.

The objective lens 113 is held by a lens hold member 114. The coreless focusing coils 115a, 115b are attached to the lens hold member 114, symmetric with respect to the zx-plane. On a side of the coils 115a, 115b is there provided a flat tracking coil 116 so that it is positioned symmetric with respect to the zx-plane. A yoke 117 and magnets 118a–118d forms a magnetic circuit so that the focusing coils 115a, 115b and the tracking coil 116 are positioned in a gap. The A yoke 117 and magnets 118a–118d are each composed of iron or another magnetic material. The magnets 118a–118d produce a magnetic field.

The mutually facing magnet pair 118a, 118b is aligned so that the magnetic poles are in the same directions; so is the other mutually facing magnet pair 118c, 118d. The adjacent magnet pair 118a, 118c is aligned so that the magnetic poles are in opposite directions; so is the other adjacent magnet pair 118b, 118d.

The objective lens actuator 100 torques the lens hold member 114 by means of the difference between the electric currents in the focusing coils 115a, 115b and moves the lens hold member 114 for focus adjustment by means of the sum of those electric currents. The objective lens actuator 100 hence provides tilt correction and focusing by a moving coil drive method, using the focusing coils 115a, 115b.

Problems arise, however, because the objective lens actuator 100 in FIG. 9 uses the focusing coils 115a, 115b commonly for both focusing and tilt correction. A difference between the electric currents in the focusing coils 115a, 115b supplied from respective drivers will produce an asymmetric focus drive force, thereby undesirably tilting the lens hold member 114.

SUMMARY OF THE INVENTION

In view of the problems, the present invention has an objective to offer an objective lens actuator capable of tilt correction and causing undesirable tilting of the objective lens only to a limited extent in focusing and other actions, and to offer an optical pickup device equipped with such an objective lens actuator.

An objective lens actuator in accordance with the present invention is capable of moving an objective lens at least in a focusing direction and performing tilt correction. The objective lens collects beams on an optical information storage medium for reading/writing information on the optical information storage medium. To achieve the objective, the objective lens actuator in accordance with the present invention includes: an objective lens holder holding the objective lens; a base body supporting the objective lens holder to enable a motion of the objective lens holder at least in a focusing direction and tilt correction; and a drive unit exerting a drive force on the objective lens holder. The drive unit includes a set of magnets mounted to the base body and a set of coils mounted to the objective lens holder. The set of magnets includes a pair of a common magnet and a divisional magnet. The pair faces each other across a gap and forms a magnetic circuit generating magnetic flux extending from either one of the common magnet and the divisional magnet to the remaining one. The divisional magnet includes a first magnet and a second magnet. The set of coils includes a focusing coil and two tilting coils. The focusing coil is disposed so that: a winding thereof cuts across the magnetic flux; the common magnet exists outside the winding; and the first and second magnets exist inside the winding. When energized, the focusing coil generates a drive force in a focusing direction. The two tilting coils are each disposed so that: a winding thereof cuts across the magnetic flux; the common magnet exists outside the winding; either one of the first and second magnets exists inside the winding; and a remaining one of the first and second magnets exists outside the winding. When energized, the two tilting coils generate a drive force for tilt correction.

Alternatively, the objective lens actuator in accordance with the present invention includes: an objective lens holder holding an objective lens; a base body supporting the objective lens holder so that the objective lens holder is displaceable; a common magnet mounted to the base body; a first magnet and a second magnet mounted to the base body so that the first and second magnets face and magnetically attract the common magnet across a gap; a focusing coil mounted to the objective lens holder so that: a winding thereof cuts across the gap; either the common magnet or the first and second magnets exist(s) outside the winding; and a remaining magnet/magnets exist(s) inside the winding; two tilting coils each mounted to the objective lens holder so that: a winding thereof cuts across the gap; the common magnet exists outside the winding; either one of the first and second magnets exists inside the winding; and a remaining one of the first and second magnets exists outside the winding.

According to the arrangement, the objective lens actuator operates by a moving coil drive method involving magnets mounted to a base body and coils mounted to an objective lens holder which is a movable assembly. The arrangement allows no heavy magnet to be mounted to the movable assembly, thus reducing the movable assembly in weight and improving the assembly in responsiveness in focusing and tilt correction. The arrangement allows no magnets to be mounted to the movable assembly, thus preventing the magnet's attractive force from causing an undesirable tilt of the objective lens holder.

In the arrangement, independent coils, i.e., the focusing coil and the tilting coils, are provided to generate a drive force for focusing and tilt correcting purposes respectively. In conventional arrangements where a coil for a tilting purpose is used also to generate a drive force for focusing, a discrepancy may develop between current flows through the two tilting coils. The discrepancy would result in an asymmetric drive force acting on the objective lens holder in a drive in a focusing direction, which in turn causes an undesirable tilt of the objective lens holder. In contrast, in the arrangement detailed above, the focusing coil, provided independently from the tilting coils, is energized to move the objective lens holder in a focusing direction, thereby subjecting the objective lens holder to a symmetric drive force in a focusing direction. Undesirable tilting of the objective lens holder is thus restrained.

An optical pickup device in accordance with the present invention includes: the objective lens actuator; and a light source generating light with which to write/read information on the optical information storage medium. The optical pickup device thus obtained produces the aforementioned effects.

Additional objects, advantages and novel features of the invention will be set forth in part in the description which follows, and in part will become apparent to those skilled in the art upon examination of the following or may be learned by practice of the invention. For a fuller understanding of the nature and advantages of the invention, reference should be made to the ensuing detailed description taken in conjunction with the accompanying drawings.

BRIEF DESCRIPTION OF THE DRAWINGS

FIGS. 8(a), 8(b) are a side view and a top view respectively of an objective lens actuator based on which the objective lens actuator in FIGS. 1(a)–1(c) was designed, FIG. 8(c) is a top view of the objective lens actuator with a part of a top base being removed, and FIG. 8(d) is a cross-sectional view taken along line D—D in FIG. 8(c).

DESCRIPTION OF THE EMBODIMENTS

Figure 1:
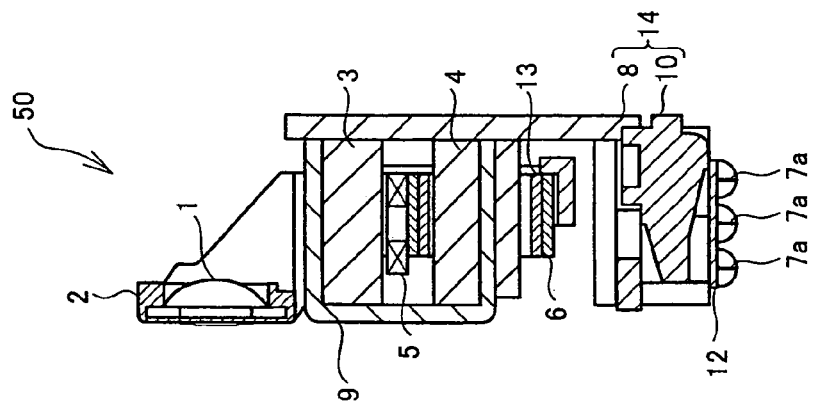
FIGS. 1(a), 1(b) are a side view and a top view respectively of an objective lens actuator which is an embodiment of the present invention.
FIG. 1(c) is a cross-sectional view taken along line A—A in FIG. 1(b).
Figure 1:
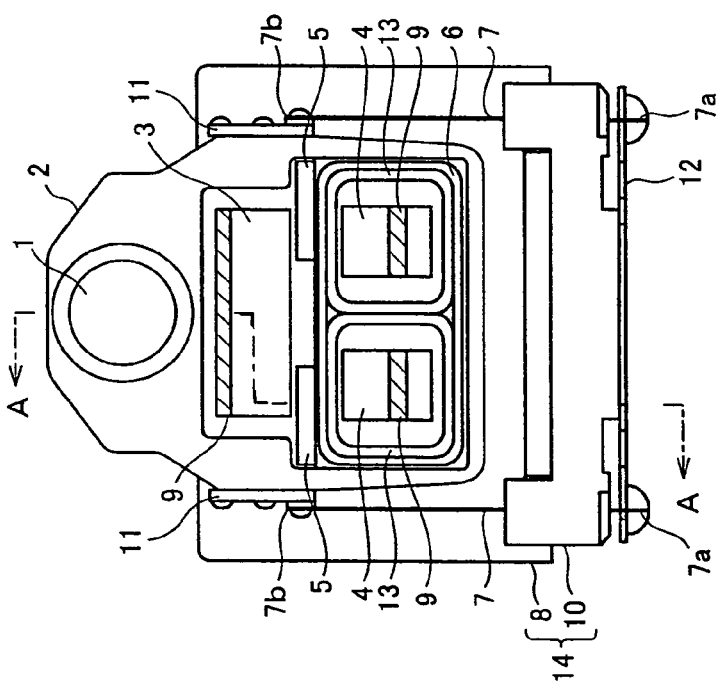
Figure 1:
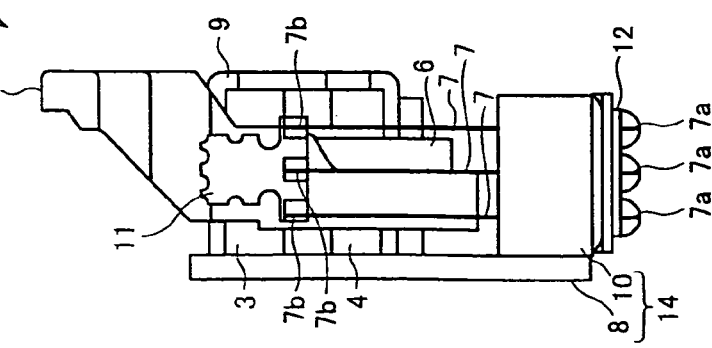

The following will describe an embodiment of the present invention with reference to FIG. 1(a) to FIG. 8(d).

An objective lens actuator of the present embodiment is incorporated in an optical pickup device in an information read/write device for an optical information disc. An optical pickup device reads/writes information by guiding, using a predetermined optical system, beams emitted from a semiconductor laser or other light source at a predetermined wavelength onto an information storage side of the optical information disc and collecting the guided beams on the information storage surface by means of an objective lens. The objective lens actuator has an objective lens and moves the lens relatively to the optical information disc in focusing and tracking directions.

The focusing direction is the direction of the optic axis of the objective lens 1, and the tracking direction is a radial direction of the optical information disc.

In this specification, "optical information discs" refer to optical information storage media, such as optical discs and magneto-optical discs, which allows storage and retrieval of information by means of beams collected on an information storage surface.

FIGS. 8(a)–8(d) show the construction of an objective lens actuator 60 based on which the present embodiment was designed. FIGS. 8(a), 8(b), 8(d) are a side view, a top view, and a cross-sectional view of the objective lens actuator 60 respectively. FIG. 8(c) is another top view of the actuator 60, but differs from FIG. 8(b) in that an upper part of a top base 9 is removed to clearly show the internal structure.

The objective lens actuator 60 has: a stationary holder 10 mounted securely to a main body (not shown in the figure) of the optical pickup device; a stationary base 8 secured to the stationary holder 10; and an objective lens holder 2 attached movably to the stationary holder 10. The objective lens holder 2 holds the objective lens 1.

The objective lens holder 2 is supported by the stationary holder 10 and intervening elastic support members 7. Two elastic support members 7 are provided on each side of the objective lens holder 2 and stationary holder 10 (i.e., four in total). The elastic support members 7 are positioned mutually parallel. An end of each elastic support member 7 is secured to the objective lens holder 2, while the other end is secured to the stationary holder 10, so that the objective lens holder 2 is supported only on one end. The objective lens holder 2 is thus movable in the focusing and tracking directions, and even if it has moved, maintains the orientation of the objective lens 1, that is, the optic axis direction of the objective lens 1.

The objective lens holder 2 has two tracking coils 5 and a focusing coil 6 attached thereto. When energized, the tracking coils 5 and the focusing coil 6 experience force in the magnetic field present between a main magnet 3 near the objective lens 1 and another main magnet 4 near the stationary holder 10, both magnets being attached to the stationary base 8 (detailed later). The force moves the objective lens holder 2 in the focusing and tracking directions.

The elastic support member 7 is typically made of a metal wire or a leaf spring material. The elastic support member 7 also provides a supply path linking the stationary holder 10 to the tracking coils 5 and the focusing coil 6 for electric current feed.

A pair of magnets, the main magnet 3 and the main magnet 4, are attached to the stationary base 8 so as to face each other. The main magnet 3 and the main magnet 4 are positioned to magnetically attract each other, in other words, so that the pair produces such a magnetic field in which magnetic flux extends from one of the magnets to the other magnet. The main magnet 3 and the main magnet 4 are attached to the top base 9 on their backs, i.e., the faces opposite to those facing each other. The top base 9 is a yoke connecting the main magnet 3 to the main magnet 4. The main magnet 3, the main magnet 4, and the top base 9 form a magnetic circuit.

The focusing coil 6 is positioned to cut across the magnetic field. The tracking coil 5 is located to a side of the focusing coil 6. The focusing coil 6 and the tracking coil 5, when energized, experience force in the magnetic field according to the Fleming's left-hand rule. With the force maintaining the orientation of the objective lens 1, the objective lens holder 2 is moved in either a focusing direction or a tracking direction which cross at right angles.

Next, the objective lens actuator for the present embodiment will be described. An objective lens actuator 50 is illustrated in FIGS. 1(a)–1(c) showing its side, top, and cross-sectional views respectively. The same numeral references are used to indicate members corresponding to those of the foregoing objective lens actuator 60. In FIG. 1(b), similarly to FIG. 8(c), an upper part of the top base 9 is removed to clearly show the internal structure.

The objective lens actuator 50 is capable of displacing the objective lens 1 in the focusing and tracking directions and performing tilt correction. The tilt correction is defined as deliberate inclining of the optic axis of the objective lens 1 to compensate for bowl-like warping of the optical information disc and resultant inclination of the information storage surface in a radial direction. The tilt correction hence maintains the optic axis perpendicular to the information storage surface. In the tilt correction, the optic axis of the objective lens 1 is inclined in the plane defined by the tracking and focusing directions.

The objective lens actuator 50 differs from the objective lens actuator 60 primarily in that the main magnet located near the stationary holder is divided into two parts and that there are provided tilting coils 13.

The objective lens actuator 50 has: an objective lens holder 2 holding the objective lens 1; and a base body 14 composed of a stationary base 8 and a stationary holder 10. The base body 14 fixed to a housing (not shown in the figure) of the optical pickup device. The objective lens holder 2 is supported by the base body 14 and intervening linear elastic support members 7 so as to be movably attached to the base body 14.

Three elastic support members 7 are provided on each side of the objective lens holder 2 and stationary holder 10 (i.e., six in total). The elastic support member 7 is typically made of, for example, a metal wire or leaf spring material. The plastic support members 7 are positioned mutually parallel. An end of each elastic support member 7 is secured to the objective lens holder 2, while the other end is secured to the stationary holder 10, so that the objective lens holder 2 is supported only on one end. The objective lens holder 2 is thus movable in the focusing and tracking directions, and even if it has moved, maintains the orientation of the objective lens 1, that is, the optic axis direction of the objective lens 1. The structure realizes the tilt correction through inclining of the objective lens holder 2.

The objective lens holder 2 has two tracking coils 5, a focusing coil 6, and two tilting coils 13 attached thereto. The objective lens holder 2 in some cases is made of a carbon-containing resin material, magnesium, or other electrically conductive material for reduced weight. It is preferred here too if the objective lens holder 2 is coated with insulating material to give it an insulating surface. An insulating coating may be made, specifically, by immersing the holder 2 in a quickly drying, low viscosity acrylic coating material for subsequent drying or spraying such a material onto the holder 2. These methods advantageously provide excellent productivity and ease of manipulation, and are inexpensive. The coating prevents shorting from occurring due to the winding touching the surface of the objective lens holder 2 when the insulating coating on the winding of the coils attached to the objective lens holder 2 deteriorates.

The tracking coils 5, the focusing coil 6, and the tilting coils 13, when energized, experience force in the magnetic field present between a main magnet 3 near the objective lens 1 and main magnets 4 near the stationary holder 10, all magnet being attached to the stationary base 8 (detailed later). The force moves the objective lens holder 2 in the focusing and tracking directions or corrects tilting.

The tracking coils 5, the focusing coil 6, and the tilting coils 13, as well as the main magnet 3 and the main magnets 4, form an objective lens actuator unit as a drive unit.

The tracking coils 5, the focusing coil 6, and the tilting coils 13, as well as the main magnet 3 and the main magnets 4, are arranged symmetric with respect to a plane containing the optic axis of the objective lens 1. So is the elastic support members 7.

The main magnet 3 and the main magnets 4 are mounted to the stationary base 8. The main magnets 4 are positioned facing the main magnet 3. The main magnet 3 and the main magnets 4 are positioned to magnetically attract each other, in other words, so that the magnets produces such a magnetic field in which magnetic flux extends from either the main magnet 3 or the main magnets 4 to the other(s).

The main magnet 3 and the main magnets 4 are attached to the top base 9 on their backs, i.e., the faces opposite to those facing each other. Forming a part of a magnetic circuit, the top base 9 is a yoke connecting the main magnet 3 to the main magnets 4.

In other words, most of the magnetic flux passes through the top base 9 from either the main magnet 3 or the main magnets 4 to the other(s), except where the main magnet 3 faces the main magnets 4. Thus, the magnetic flux "leaks" primarily into the gap between the main magnet 3 and the main magnets 4. Hereinafter, the terms, "magnetic flux" and "magnetic field," with no modifiers refer exclusively to the magnetic flux leaking to the gap between the main magnet 3 and the main magnets 4 and the magnetic field produced by the flux.

The focusing coil 6 is positioned so that its winding cuts across the magnetic flux and encloses the main magnets 4. The main magnet 3 is outside the winding. The focusing coil 6 is positioned so that planes parallel to the winding are perpendicular to the focusing direction.

Therefore, the focusing coil 6, when energized, experiences drive force in a focusing direction in the magnetic field according to the Fleming's left-hand rule, moving the objective lens holder 2 to which the focusing coil 6 is attached, and hence the objective lens 1, in the focusing direction. The focusing action of the objective lens 1 is thus achieved.

Figure 2:
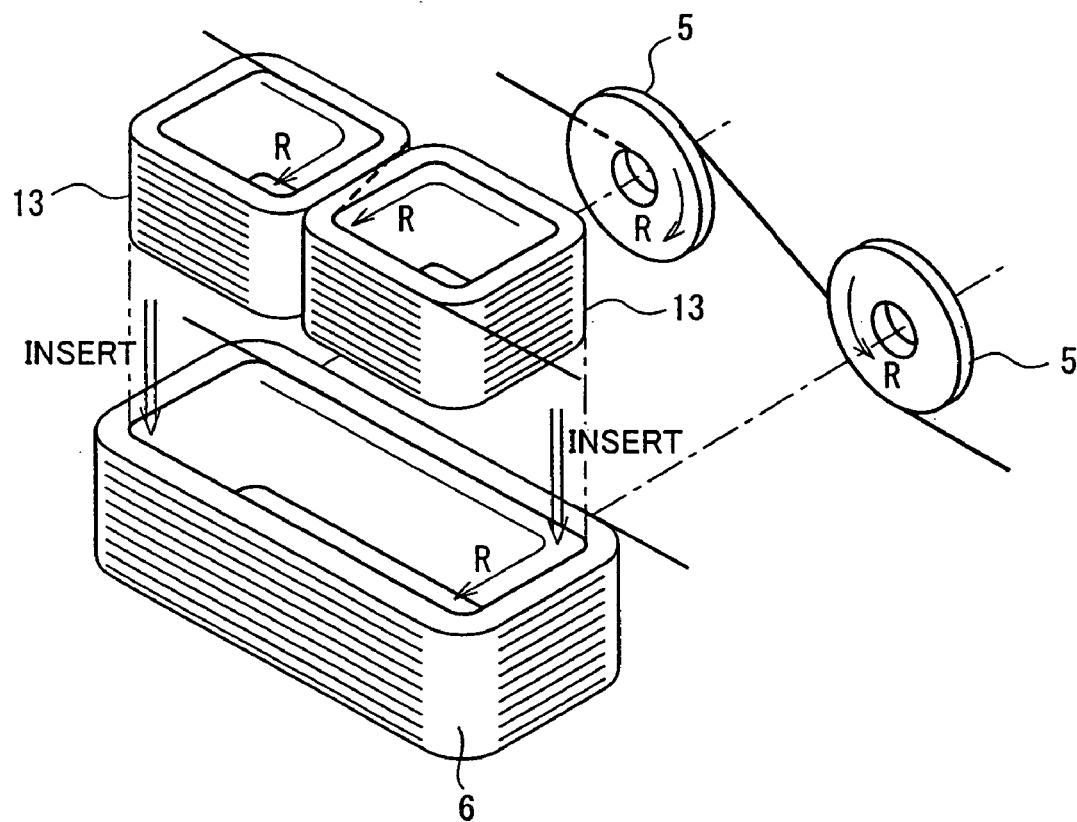
FIG. 2 is a perspective view illustrating relative positions of a focusing coil, a tracking coil, and a tilting coil provided in the objective lens actuator shown in FIGS. 1(a)–1(c).
Figure 4:
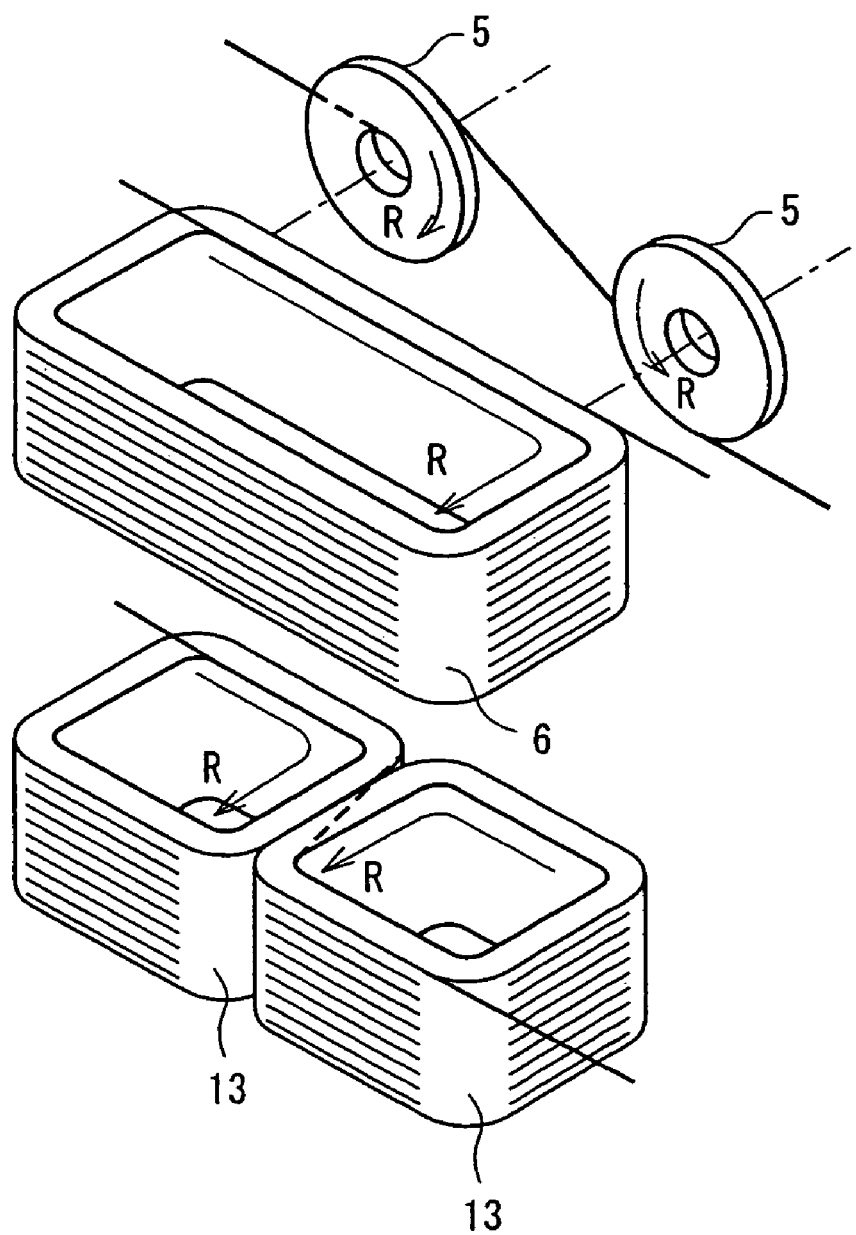
FIG. 4 is a perspective view illustrating relative positions of a focusing coil, a tracking coil, and a tilting coil provided in the objective lens actuator shown in FIGS. 3(a)–3(c).
Figure 6:
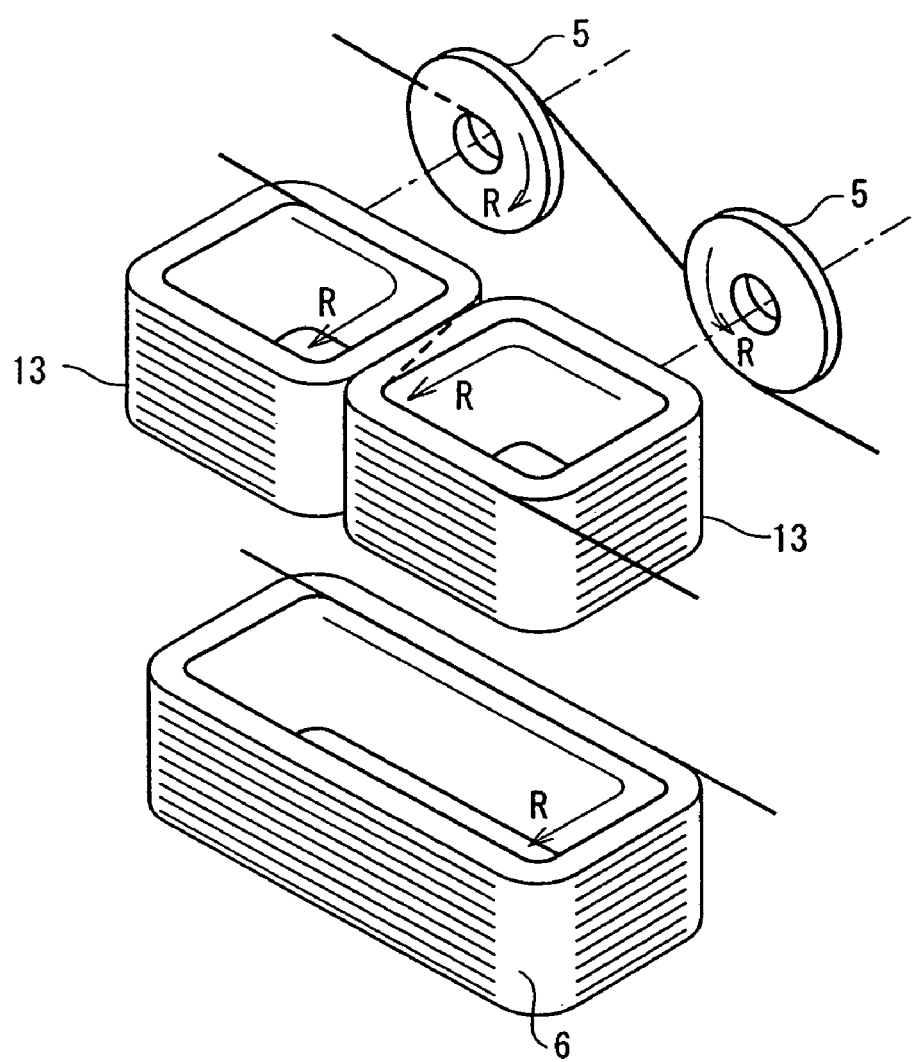
FIG. 6 is a perspective view illustrating relative positions of a focusing coil, a tracking coil, and a tilting coil provided in the objective lens actuator shown in FIGS. 5(a)–5(c).
Figure 7:
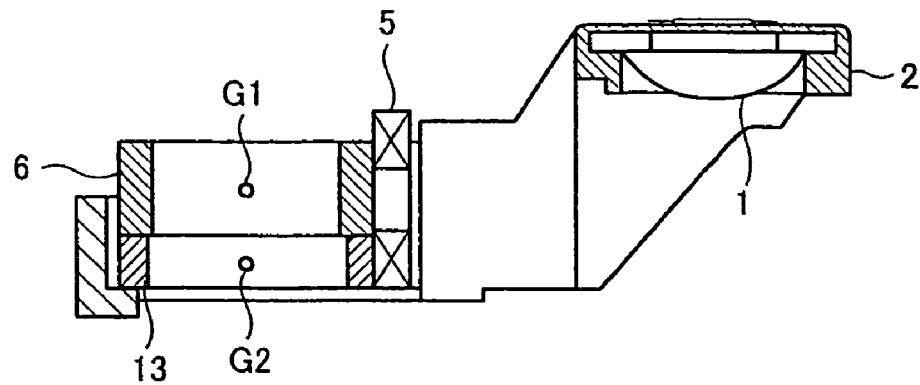
FIGS. 7(a)–7(c) are cross-sectional views illustrating the objective lens actuator in FIGS. 3(a)–3(c) in constructions with a movable assembly having different centers of gravity.
Figure 7:
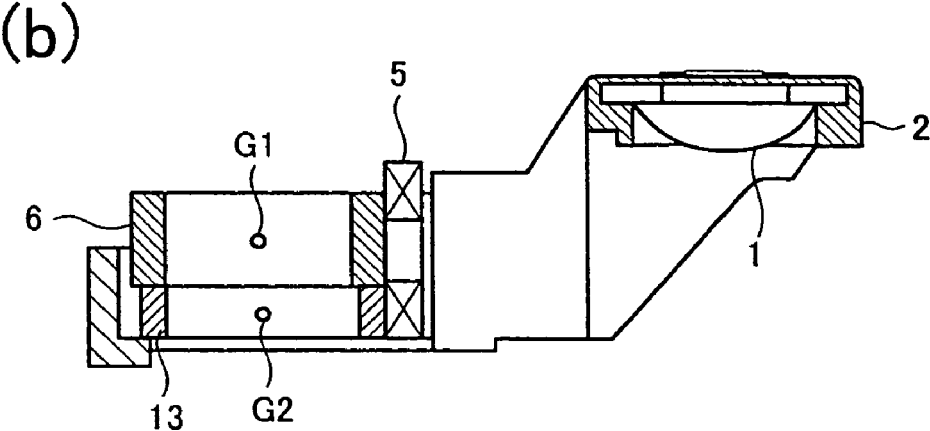
Figure 7:
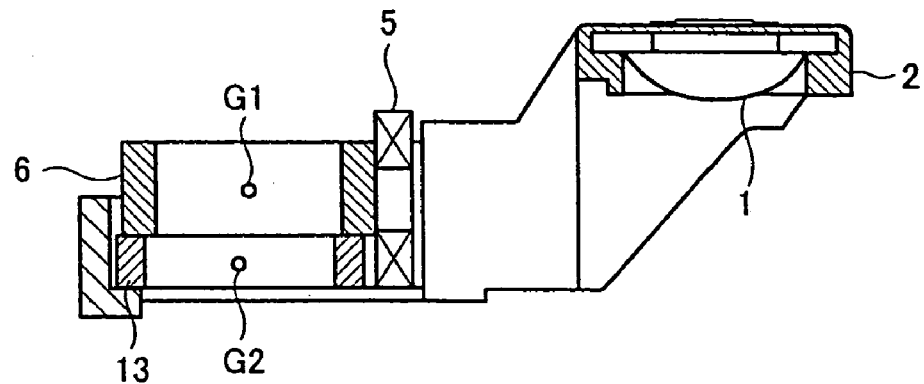

The tracking coils 5 are provided on a side of the focusing coil 6. Planes parallel to the winding of the coils 5 cross the magnetic flux. More specifically, planes parallel to the winding are parallel to the focusing and tracking directions. The tracking coils 5 are located so that parts of the coils 5 face the main magnet 3 and the main magnets 4 in the gap between the main magnet 3 and the main magnets 4. The tracking coils 5 is made up of a common wire wound in opposite directions as shown in FIG. 2. In FIGS. 2, 4, 6, the direction of the coil winding is indicated by an arrow R. Therefore, when the common wire is energized, the windings conduct current in opposite rotational directions.

In other words, when energized, the tracking coils 5 experience drive force in a tracking direction in the magnetic field according to the Fleming's left-hand rule, moving the objective lens holder 2 to which the tracking coils 5 are attached, and hence the objective lens 1, in the tracking direction. The tracking action of the objective lens 1 is thus achieved.

The tilting coils 13 are positioned so that their windings cut across the magnetic flux and enclose the associated one of the main magnets 4 while leaving the other one outside. The main magnet 3 is outside the windings. The tilting coils 13 are positioned so that planes parallel to the windings are perpendicular to the focusing direction.

Further referring to FIG. 2, the tilting coils 13 are made up of a common wire wound in opposite directions. Therefore, when the common wire is energized, the windings conduct current in opposite directions. In this structure, the tilting coils 13 conduct a common electric current; the current flows in the tilting coils 13 can be controlled together, which facilitates the electric current control.

Therefore, the tilting coils 13, when energized, experience force in mutually opposite focusing directions in the magnetic field according to the Fleming's left-hand rule. Referring to FIG. 1(*b*), when one of the tilting coils 13 experiences drive force toward the front of the paper, the other one experiences drive force toward the back of the paper. The drive force exerts, on the objective lens holder 2 to which the tilting coils 13 are attached, a torque in the same direction as the tilting, thereby rotating the objective lens holder 2 together with the objective lens 1 in that direction. The tilt correction action of the objective lens 1 is thus achieved.

As described earlier, to enable tilt correction using the tilting coils 13, the structure includes the two main magnets 4 and the top base 9 divided into two parts to respectively accommodate the two main magnets 4. Space is provided between the main magnet 3 and the objective lens holder 2 and between the main magnets 4 and the tilting coils 13, preventing the fixed assembly from obstructing the movable assembly in tracking and tilt correction.

It is preferred if the focusing coil 6, the tracking coils 5, the tilting coils 13 are fed with electric current through the elastic support members 7. When this is actually the case, the stationary holder ends 7*a* of the elastic support members 7 are secured to an insulating FPC connection board 12 which is in turn secured to the stationary holder 10, and the objective lens holder ends 7*b* of the elastic support members 7 are secured to insulating connection boards 11 which are in turn secured to both sides of the objective lens holder 2. The ends 7*a* are coupled, on the FPC connection board 12, to wiring from a drive control circuit for the optical pickup device (not shown). The ends 7*b* are connected, on the connection boards 11, to the ends of the coils.

Referring back to FIG. 2, the tilting coils 13 are disposed inside the focusing coil 6. To put it the other way round, the focusing coil 6 has its winding surrounding the tilting coils 13. The configuration contributes to reductions in focusing direction dimension, or height, of the objective lens actuator 50.

Figure 3:
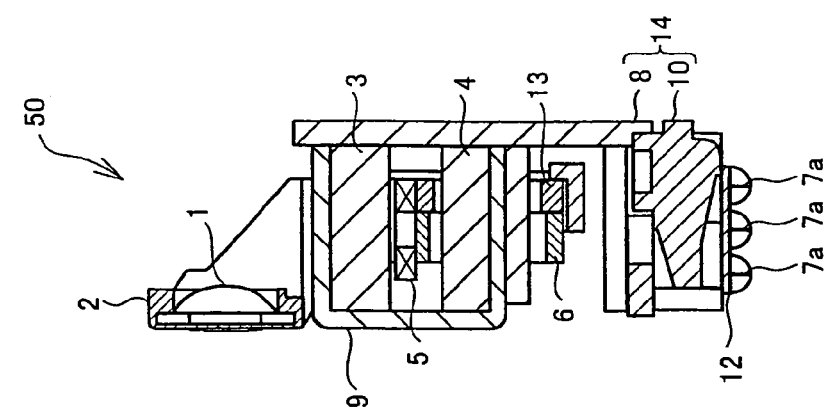
FIGS. 3(a), 3(b) are a side view and a top view respectively of a variation of the objective lens actuator in FIGS. 1(a)–1(c)
FIG. 3(c) is a cross-sectional view taken along line B—B in FIG. 3(b).
Figure 3:
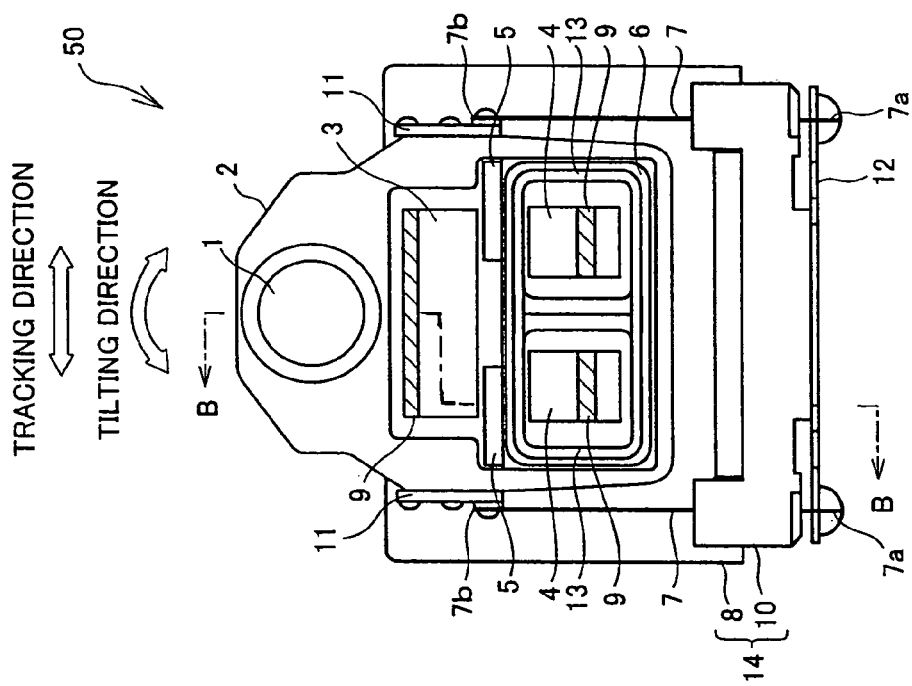
Figure 3:
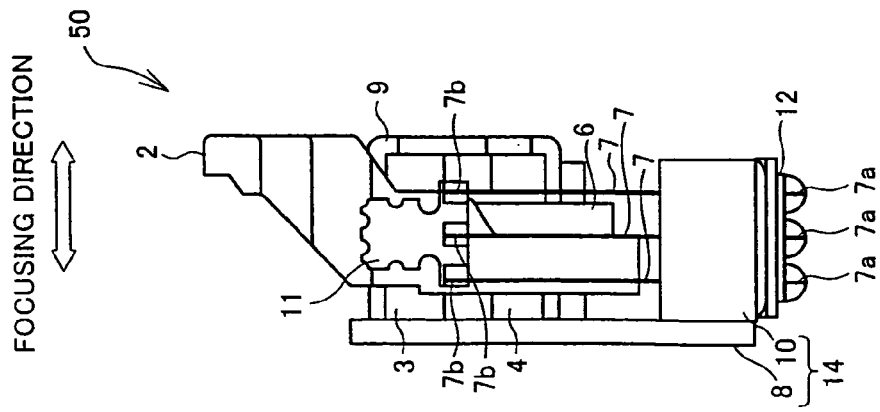
Figure 5:
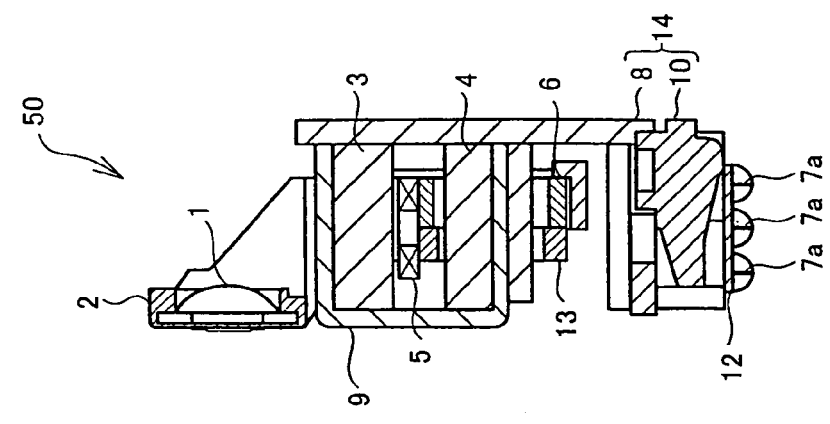
FIGS. 5(a), 5(b) are a side view and a top view respectively of another variation of the objective lens actuator in FIGS. 1(a)–1(c)
FIG. 5(c) is a cross-sectional view taken along line C—C in FIG. 5(b).
Figure 5:
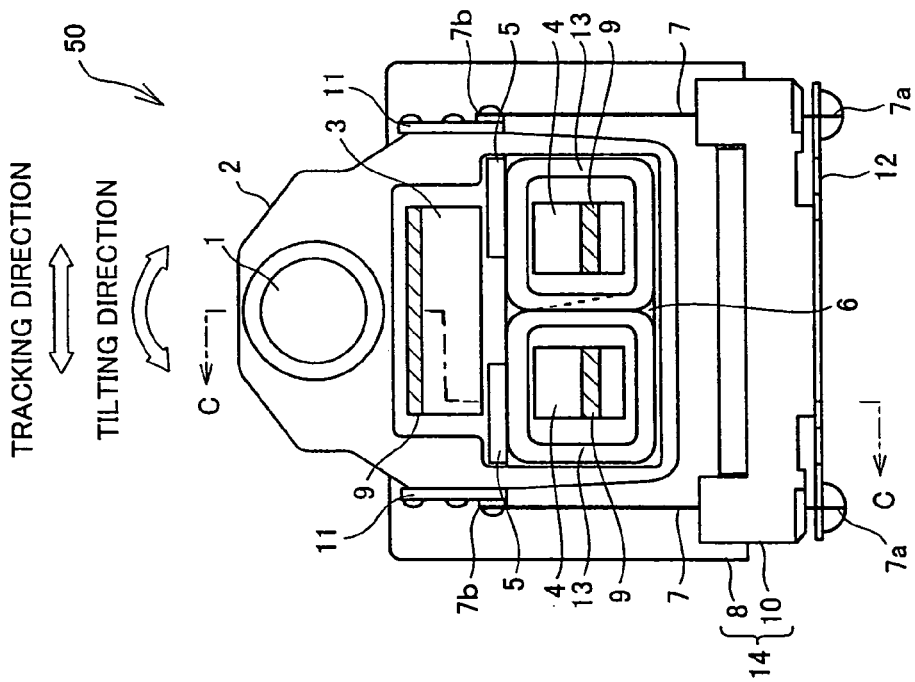
Figure 5:
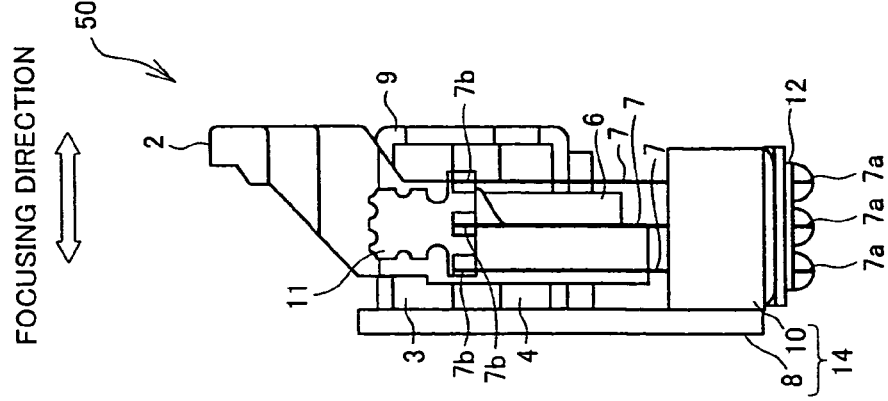

Alternatively, the focusing coil 6 and the tilting coils 13 may be placed as shown in either FIGS. 3(*a*)–3(*c*) and 4 or FIGS. 5(*a*)–5(*c*) and 6: the focusing coil 6 is displaced in a direction perpendicular to a plane parallel to the winding of the tilting coils 13.

FIGS. 3(*a*)–3(*c*) and 4 indicate the relative positions: the tilting coils 13 are near the bottom or the stationary base 8, and the focusing coil 6 is near the top. The center of gravity of the movable assembly is lower in this configuration than in the previous one in FIGS. 8(*a*)–8(*d*) involving no tilting coils 13.

FIGS. 5(*a*)–5(*c*) and 6 give another possibility: the focusing coil 6 is near the bottom or the stationary base 8, and the tilting coils 13 is near the top. The center of gravity of the movable assembly is higher in this configuration than in the previous one in FIGS. 8(*a*)–8(*d*) involving no tilting coils 13.

The positions of the focusing coil 6 and the tilting coils 13, with one placed on the other, may be further modified.

The center of gravity of the tilting coils 13 may be displaced out of alignment with the center of gravity of the focusing coil 6 in a direction perpendicular to the focusing direction as shown in FIGS. 7(a)–7(c), to shift the center of gravity of the movable assembly. FIGS. 7(a)–7(c) illustrate only the movable assembly for the focusing coil 6 disposed on the tilting coils 13.

FIG. 7(a) shows the center of gravity, G1, of the focusing coil 6 in alignment with the center of gravity, G2, of the tilting coil 13 in the front-back direction. FIG. 7(b) shows the center of gravity, G2, of the tilting coil 13 displaced forward, or toward the objective lens 1, relative to the center of gravity, G1, of the focusing coil 6. Thus, the net center of gravity of the movable assembly is shifted forward. FIG. 7(c) shows the center of gravity, G2, of the tilting coil 13 displaced backward, or toward the stationary holder 10, relative to the center of gravity, G1, of the focusing coil 6. Thus, the net center of gravity of the movable assembly can be shifted backward.

These configurations open up a possibility to use the tilting coils 13 as a balancer adjusting the center of gravity of the movable assembly, eliminating the need to provide a separate balancer in the movable assembly.

Advantages will be now described of using the tilting coils 13, not the focusing coil 6 or the tracking coils 5, as a balancer.

The focusing coil 6 and the tracking coils 5 preferably prevent the optic axis of the objective lens 1 from inclining as much as possible, while moving the objective lens holder 2 in a focusing or tracking direction. The positions of the focusing coil 6 and the tracking coils 5 need be determined considering the coils' relative positions to the main magnet 3 and the main magnets 4. Therefore, preferably, the focusing coil 6 and the tracking coils 5 are not displaced to adjust the center of gravity of the movable assembly.

On the other hand, the tilting coils 13 is provided to incline the optic axis of the objective lens 1 for tilt correction. The objective lens holder 2 is accordingly moved by a smaller amount by the tilting coils 13 than by the focusing coil 6 and the tracking coils 5. The tilting coils 13 therefore do not need be adjusted in position relative to the main magnets 3, 4 as strictly as the focusing coil 6 and the tracking coils 5, and may be displaced to adjust the center of gravity of the movable assembly.

For a stable focusing action, it is preferred if the drive forces acting on the focusing coil 6 in the action have a net point of application close to, or right on, the center of gravity of the movable assembly. This is achieved by adjusting the center of gravity of the movable assembly by means of the tilting coils 13 in the foregoing manner.

For easy and wide-range adjustment of the center of gravity of the movable assembly, the windings of the tilting coils 13 may be composed of a material having a different specific gravity from those for the windings of the focusing coil 6 and the tracking coils 5. To elevate the center of gravity of the movable assembly, the winding of the coil in the upper position is made of a material having a relatively large specific gravity, such as copper, whereas the winding of the coil in the lower position is made of a material having a relatively small specific gravity, such as aluminum. Conversely, to lower the center of gravity of the movable assembly, the winding of the coil in the upper position is made of a material having a relatively small specific gravity, such as aluminum, whereas the winding of the coil in the lower position is made of a material having a relatively large specific gravity, such as copper.

As in the foregoing, the objective lens actuator 50 is capable of moving the objective lens 1 at least in a focusing direction and carrying out tilt correction on the lens 1. The objective lens 1 is intended to collect light onto an optical information disc for writing and retrieving information on the optical information disc. The objective lens actuator 50 is made up of: the objective lens holder 2 holding the objective lens 1; the base body 14 supporting the objective lens holder 2 to enable at least motion in a focusing direction and tilt correction; and the drive unit applying a drive force to the objective lens holder 2. The drive unit includes a set of magnets mounted to the base body 14 and a set of coils mounted to the objective lens holder 2.

The set of magnets includes a magnetic-circuit-forming pair of magnets facing each other across a gap where the paired magnets generate magnetic flux extending from one of the magnets to the other one. The pair of magnets includes the main magnet 3 as a common magnet and the main magnets 4 as a divisional magnet. One of the main magnets 4 will be referred to as a first magnet, and the other as a second magnet.

The set of coils includes the focusing coil 6 and the two tilting coils 13. The focusing coil 6 is located so that: its winding cuts across the magnetic flux; the main magnet 3 is present outside the winding, and the main magnets 4 are present inside the winding. When energized, the focusing coil 6 generates a drive force for focusing. Each tilting coil 13 is located so that: its winding cuts across the magnetic flux; the main magnet 3 is present outside the winding; one of the main magnets 4 is present inside the winding; and the remaining one of the main magnets 4 is present outside the winding. When energized, the tilting coils 13 generate a drive force for tilt correction.

The objective lens actuator 50 operates by a moving coil drive method involving magnets mounted to a base body and coils mounted to an objective lens holder which is a movable assembly. The structure needs no heavy magnet to be mounted to the movable assembly, thus reducing the movable assembly in weight and improving the assembly in responsiveness in focusing and tilt correction. The structure needs no magnets to be mounted to the movable assembly, thus preventing the magnet's attractive force from causing an undesirable tilt of the objective lens, holder.

In the aforementioned structure, independent coils, i.e., the focusing coil 6 and the tilting coils 13, are provided to generate a drive force for focusing and tilt correcting purposes respectively.

Figure 9:
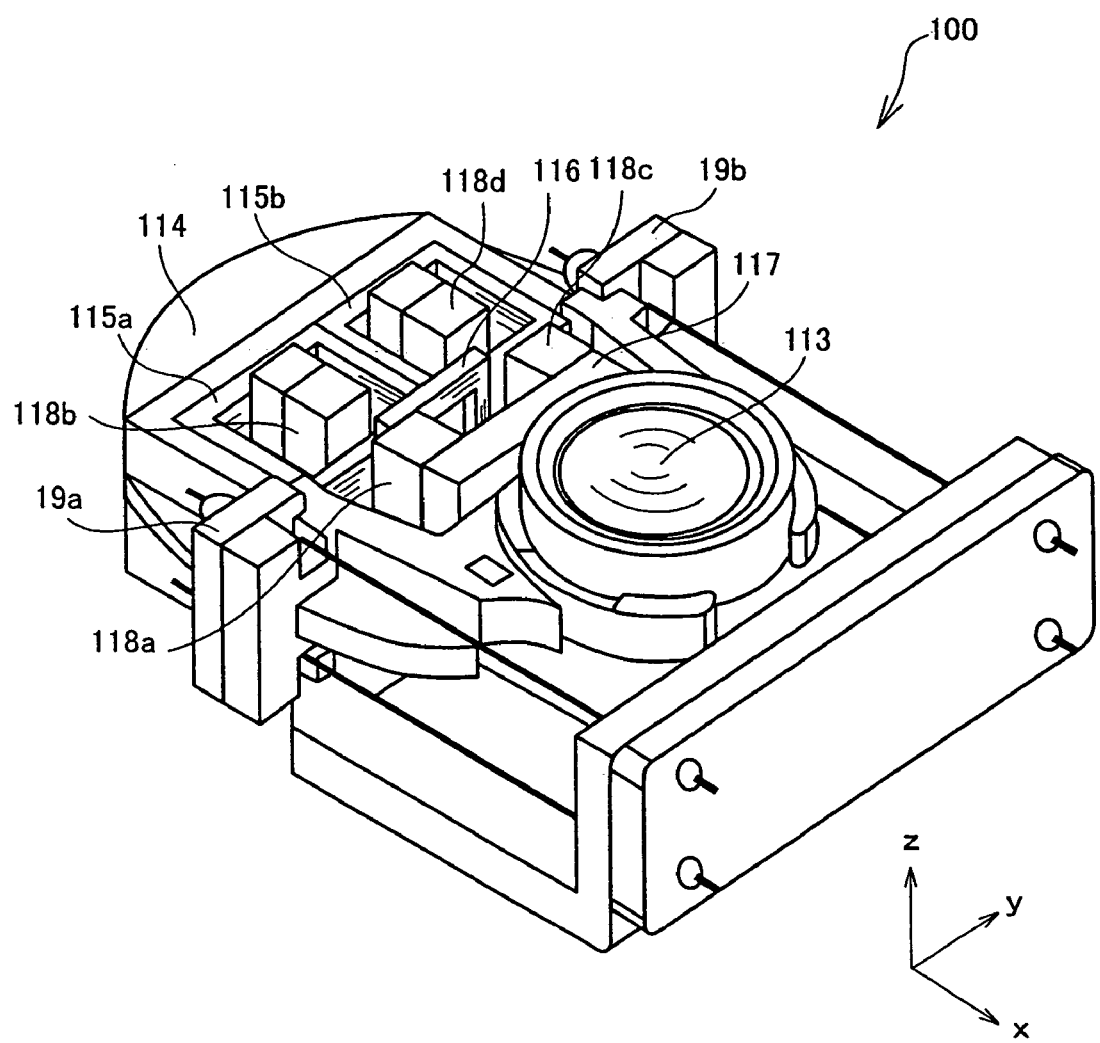
FIG. 9 is a perspective view illustrating a conventional objective lens actuator.

In the structure in FIG. 9 where a coil for a tilting purpose is used also to generate a drive force for focusing, a discrepancy may develop between current flows through the two tilting coils. The discrepancy would result in an asymmetric drive force acting on the lens hold member 114 in a drive in a focusing direction, which in turn causes an undesirable tilt of the lens hold member 114.

In contrast, in the structure detailed above, the focusing coil 6, provided independently from the tilting coils 13, is energized to move the objective lens holder 2 in a focusing direction, thereby subjecting the objective lens holder 2 to a symmetric drive force in a focusing direction. Undesirable tilting of the objective lens holder 2 is thus restrained.

The objective lens actuator 50 is also capable of moving the objective lens 1 in a tracking direction. To this end, the base body 14 supports the objective lens holder 2 so that the holder 2 is movable also in a tracking direction. The set of coils is disposed in the gap between the main magnet 3 and the main magnets 4 so that the magnetic flux cuts across planes parallel to the windings. The set of coils include the tracking coils 5 which, when energized, generates a drive force in a tracking direction.

In this structure, the main magnet 3 and the main magnets 4, used to generate a drive force for focusing and tilt correction, are used also to generate a drive force in a tracking direction. This enables a tracking direction motion of the objective lens 1.

The present embodiment has so far described a structure where the focusing coil 6 is disposed to surround the main magnets 4, or in other words, where the main magnets 4 exist inside the winding of the focusing coil 6 and the main magnet 3 exists outside that winding. Alternatively, the focusing coil 6 may be disposed surrounding the main magnet 3. More specifically, the main magnet 3 and the main magnets 4 may exist inside and outside the winding of the focusing coil 6 respectively.

Figure 10:
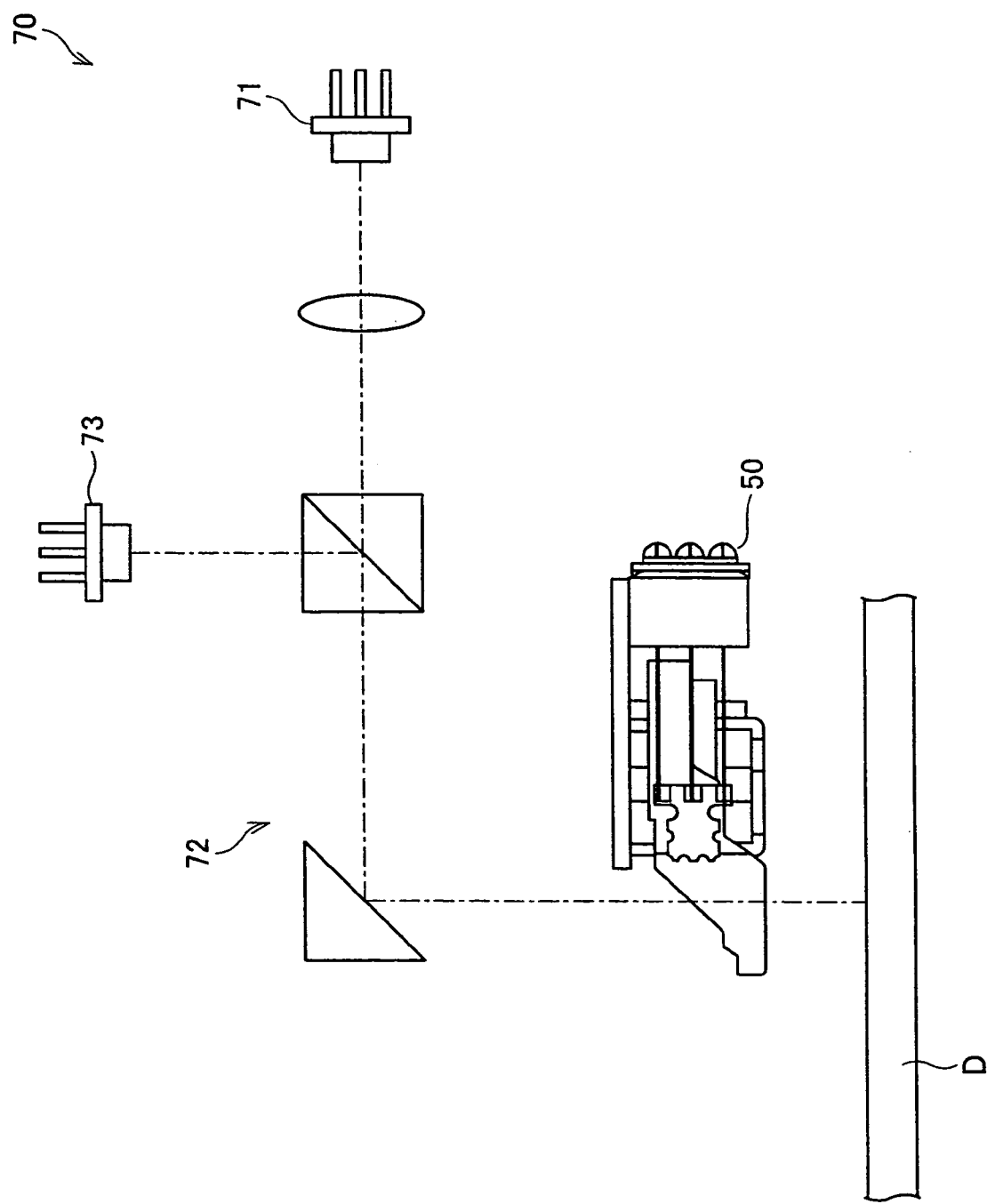
FIG. 10 is a side view of an optical pickup device which is an embodiment of the present invention.

Now, referring to FIG. 10, an optical pickup device 70 according to the present embodiment will be described. The optical pickup device 70 includes: the aforementioned objective lens actuator 50; a semiconductor laser 71 as a light source generating light for writing and retrieval of information on an optical information disc D as an optical information storage medium; and a predetermined optical system 72. The optical pickup device 70 reads/writes information by guiding, using the optical system 72, beams emitted from the semiconductor laser 71 at a predetermined wavelength onto an information storage side of the optical information disc D and collecting the guided beams on the information storage surface by means of the objective lens 1 in the objective lens actuator 50. To capture information, reflected light from the information storage surface is guided through the objective lens 1, the optical system 72, and other components to a photo diode 73 as a photoreceptor.

As in the foregoing, an objective lens actuator in accordance with the present invention is capable of moving an objective lens at least in a focusing direction and performing tilt correction. The objective lens collects beams on an optical information storage medium for reading/writing information on the optical information storage medium. The objective lens actuator in accordance with the present invention includes: an objective lens holder holding the objective lens; a base body supporting the objective lens holder to enable a motion of the objective lens holder at least in a focusing direction and tilt correction; and a drive unit exerting a drive force on the objective lens holder. The drive unit includes a set of magnets mounted to the base body and a set of coils mounted to the objective lens holder. The set of magnets includes a pair of a common magnet and a divisional magnet. The pair faces each other across a gap and forms a magnetic circuit generating magnetic flux extending from either one of the common magnet and the divisional magnet to the remaining one. The divisional magnet includes a first magnet and a second magnet. The set of coils includes a focusing coil and two tilting coils. The focusing coil is disposed so that: a winding thereof cuts across the magnetic flux; the common magnet exists outside the winding; and the first and second magnets exist inside the winding. When energized, the focusing coil generates a drive force in a focusing direction. The two tilting coils are each disposed so that: a winding thereof cuts across the magnetic flux; the common magnet exists outside the winding; either one of the first and second magnets exists inside the winding; and a remaining one of the first and second magnets exists outside the winding. When energized, the two tilting coils generate a drive force for tilt correction.

Alternatively, the objective lens actuator in accordance with the present invention includes: an objective lens holder holding an objective lens; a base body supporting the objective lens holder so that the objective lens holder is displaceable; a common magnet mounted to the base body; a first magnet and a second magnet mounted to the base body so that the first and second magnets face and magnetically attract the common magnet across a gap; a focusing coil mounted to the objective lens holder so that: a winding thereof cuts across the gap; either the common magnet or the first and second magnets exist(s) outside the winding; and a remaining magnet/magnets exist(s) inside the winding; two tilting coils each mounted to the objective lens holder so that: a winding thereof cuts across the gap; the common magnet exists outside the winding; either one of the first and second magnets exists inside the winding; and a remaining one of the first and second magnets exists outside the winding.

According to the arrangement, the objective lens actuator operates by a moving coil drive method involving magnets mounted to a base body and coils mounted to an objective lens holder which is a movable assembly. The arrangement allows no heavy magnet to be mounted to the movable assembly, thus reducing the movable assembly in weight and improving the assembly in responsiveness in focusing and tilt correction. The arrangement allows no magnets to be mounted to the movable assembly, thus preventing the magnet's attractive force from causing an undesirable tilt of the objective lens holder.

In the arrangement, independent coils, i.e., the focusing coil and the tilting coils, are provided to generate a drive force for focusing and tilt correcting purposes respectively. In conventional arrangements where a coil for a tilting purpose is used also to generate a drive force for focusing, a discrepancy may develop between current flows through the two tilting coils. The discrepancy would result in an asymmetric drive force acting on the objective lens holder in a drive in a focusing direction, which in turn causes an undesirable tilt of the objective lens holder. In contrast, in the arrangement detailed above, the focusing coil, provided independently from the tilting coils, is energized to move the objective lens holder in a focusing direction, thereby subjecting the objective lens holder to a symmetric drive force in a focusing direction. Undesirable tilting of the objective lens holder is thus restrained.

The aforementioned objective lens actuator in accordance with the present invention is preferably such that the two tilting coils are made of a common wire wound in opposite directions.

In conventional arrangements where a coil for a tilting purpose is used also to generate a drive force for focusing, the electric currents through the tilting coils must be individually controlled. In contrast, in the previous arrangement, the tilting coils conduct a common electric current; the current flows in the tilting coils can be controlled together, which facilitates the electric current control.

The aforementioned objective lens actuator in accordance with the present invention may be such that the objective lens is movable also in a tracking direction, wherein: the base body supports the objective lens holder so that the objective lens holder is movable also in the tracking direction; and the set of coils further includes a tracking coil, the tracking coil being disposed in the gap between the pair so that the magnetic flux in the gap cuts across a plane parallel to a winding of the tracking coil and that when energized, the tracking coil generates a drive force in the tracking direction.

In the arrangement, a common magnet and a divisional magnet for generating a drive force for focusing and tilt correction are also used to generate a drive force for tracking, enabling the objective lens to move in the tracking direction.

The aforementioned objective lens actuator in accordance with the present invention may be such that the winding of the focusing coil is outside the two tilting coils or the focusing coil is displaced with respect to the two tilting coils in a direction perpendicular to a plane parallel to the windings of the two tilting coils.

The aforementioned objective lens actuator in accordance with the present invention is preferably such that the two tilting coils are positioned so that the two tilting coils have a center of gravity out of alignment with that of the focusing coil in a direction perpendicular to the focusing direction.

The tilting coil is to perform tilt correction on the objective lens. The objective lens holder is accordingly moved by a smaller amount by the tilting coils than by the focusing coil. The tilting coils therefore do not need be adjusted in position relative to the common and divisional magnets as strictly as the focusing coil. Accordingly, the center of gravity of the movable assembly is adjustable using the two tilting coils as in the arrangement where the two tilting coils are positioned so that the center of gravity of the two tilting coils is out of alignment with the center of gravity of the focusing coil in a direction perpendicular the focusing direction.

The aforementioned objective lens actuator in accordance with the present invention may be such that the windings of the two tilting coils are made of an elongated material differing in specific gravity from the winding of the focusing coil. For example, either the windings of the two tilting coils or the winding of the focusing coil is/are made of copper, and the remaining winding(s) is/are made of aluminum.

The arrangement where the winding of the tilting coil is made of a material differing in specific gravity from the winding of the focusing coil enables the center of gravity of the movable assembly to be more readily adjusted across a wide range.

The aforementioned objective lens actuator in accordance with the present invention may be such that the objective lens holder is made of a resin material containing carbon.

The aforementioned objective lens actuator in accordance with the present invention is preferably such that the objective lens holder has an electrically insulating surface.

The arrangement where the objective lens holder has an electrically insulating surface prevents shorting from occurring due to the winding touching the surface of the objective lens holder when the insulating coating of the winding of the coils attached to the objective lens holder deteriorates.

An optical pickup device in accordance with the present invention includes the foregoing objective lens actuator and a light source generating light with which to write/read information on the optical information storage medium. The optical pickup device thus obtained produces the aforementioned effects.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An objective lens actuator capable of moving an objective lens at least in a focusing direction and performing tilt correction, the objective lens collecting beams on an optical information storage medium for reading/writing information on the optical information storage medium, said actuator comprising:
   an objective lens holder holding the objective lens;
   a base body supporting the objective lens holder to enable a motion of the objective lens holder at least in a focusing direction and tilt correction; and
   a drive unit exerting a drive force on the objective lens holder,
   wherein:
   the drive unit includes a set of magnets mounted to the base body and a set of coils mounted to the objective lens holder;
   the set of magnets includes a pair of a common magnet and a divisional magnet, the pair facing each other across a gap and forming a magnetic circuit generating magnetic flux extending from either one of the common magnet and the divisional magnet to a remaining one, the divisional magnet including a first magnet and a second magnet;
   the set of coils including a focusing coil and two tilting coils,
   the focusing coil being disposed so that: a winding thereof cuts across the magnetic flux; the common magnet exists outside the winding; and the first and second magnets exist inside the winding,
   the focusing coil, when energized, generating a drive force in a focusing direction,
   the two tilting coils being each disposed so that: a winding thereof cuts across the magnetic flux; the common magnet exists outside the winding; either one of the first and second magnets exists inside the winding; and a remaining one of the first and second magnets exists outside the winding;
   the two tilting coils, when energized, generating a drive force for tilt correction.

2. The objective lens actuator as set forth in claim 1, wherein
   the two tilting coils are made of a common wire wound in opposite directions.

3. The objective lens actuator as set forth in claim 1, wherein
   the objective lens is movable also in a tracking direction, wherein:
   the base body supports the objective lens holder so that the objective lens holder is movable also in the tracking direction; and
   the set of coils further includes a tracking coil, the tracking coil being disposed in the gap between the pair so that the magnetic flux in the gap cuts across a plane parallel to a winding of the tacking coil and that when energized, the tracking coil generates a drive force in the tracking direction.

4. The objective lens actuator as set forth in claim 1, wherein
   the winding of the focusing coil is outside the two tilting coils.

5. The objective lens actuator as set forth in claim 1, wherein
   the focusing coil is displaced with respect to the two tilting coils in a direction perpendicular to a plane parallel to the windings of the two tilting coils.

6. The objective lens actuator as set forth in claim 5, wherein the two tilting coils are positioned so that the two tilting coils have a center of gravity out of alignment with that of the focusing coil in a direction perpendicular to the focusing direction.

7. The objective lens actuator as set forth in claim 6, wherein the windings of the two tilting coils are made of an elongated material differing in specific gravity from the winding of the focusing coil.

8. The objective lens actuator as set forth in claim 7, wherein either the windings of the two tilting coils or the winding of the focusing coil is/are made of copper, and a remaining winding(s) is/are made of aluminum.

9. The objective lens actuator as set forth in claim 1, wherein the objective lens holder is made of a resin material containing carbon.

10. The objective lens actuator as set forth in claim 1, wherein the objective lens holder has an electrically insulating surface.

11. An optical pickup device, comprising:

an objective lens actuator as set forth in claim 1; and a light source generating light with which to write/read information on the optical information storage medium.

12. An objective lens actuator, comprising:

an objective lens holder holding an objective lens;

a base body supporting the objective lens holder so that the objective lens holder is displaceable;

a common magnet mounted to the base body;

a first magnet and a second magnet mounted to the base body so that the first and second magnets face and magnetically attract the common magnet across a gap;

a focusing coil mounted to the objective lens holder so that: a winding thereof cuts across the gap; either the common magnet or the first and second magnets exist(s) outside the winding; and a remaining magnet/ magnets exist(s) inside the winding;

two tilting coils each mounted to the objective lens holder so that: a winding thereof cuts across the gap; the common magnet exists outside the winding; either one of the first and second magnets exists inside the winding; and a remaining one of the first and second magnets exists outside the winding.

13. The objective lens actuator as set forth in claim 12, wherein the two tilting coils are made of a common wire wound in opposite directions.

14. The objective lens actuator us set forth in claim 12, further comprising a tracking coil disposed so that a winding thereof cuts across the gap and that the common magnet and the first and second magnets face a plane parallel to the winding.

15. The objective lens actuator as set forth in claim 12, wherein the objective lens holder has an electrically insulating surface.

16. An optical pickup device, comprising:

an objective lens actuator as set forth in claim 12; and a light source generating light with which to write/read information on the optical information storage medium.

* * * * *